Aug. 21, 1956  A. KUNDERT  2,759,339
REFRIGERATED PLATE, WITH FROST PREVENTION
Filed Sept. 21, 1953
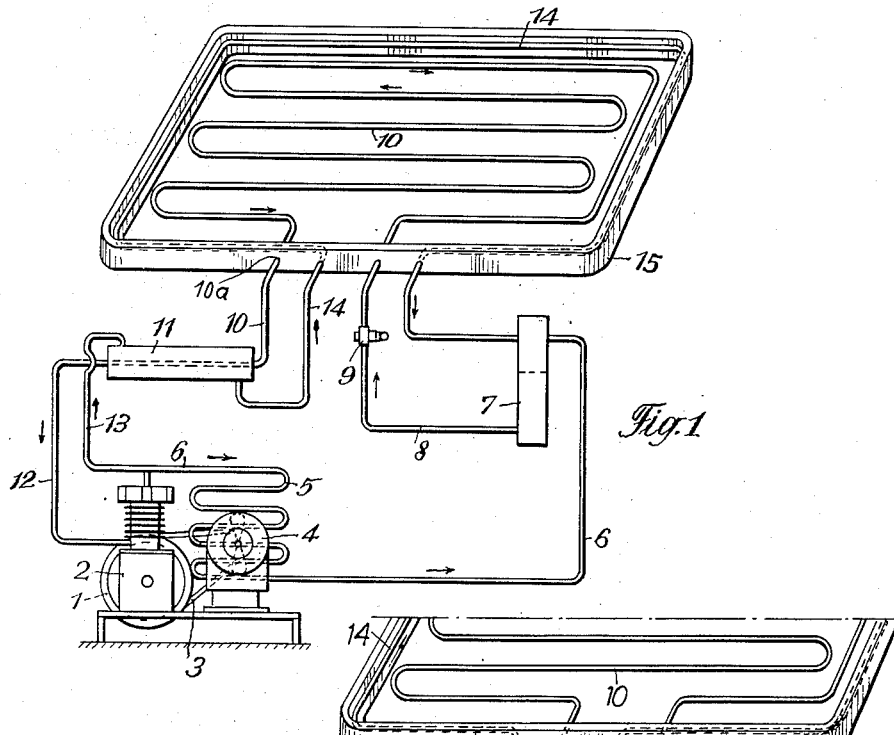
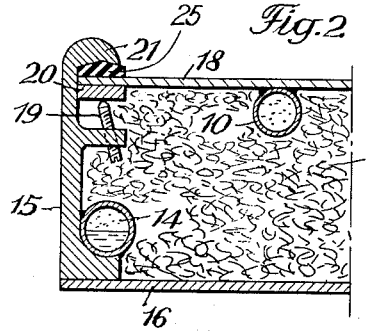
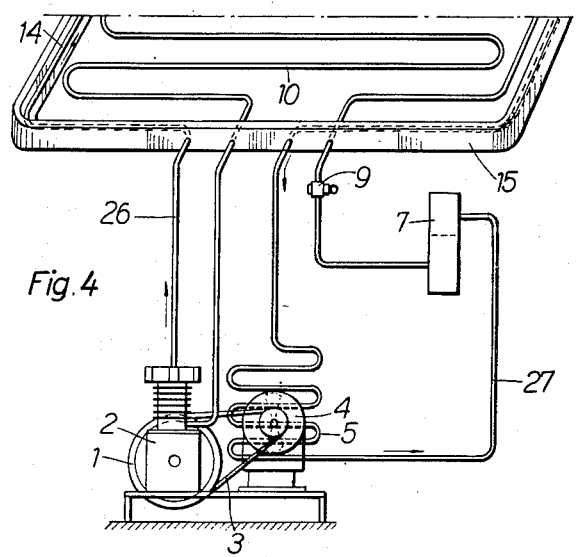
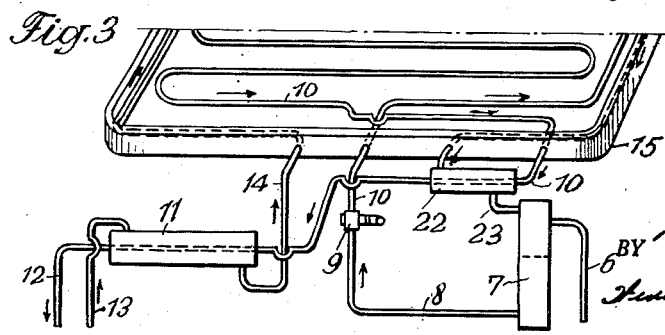
INVENTOR.
ADOLPHE KUNDERT
BY

2,759,339

Patented Aug. 21, 1956

2,759,339

REFRIGERATED PLATE, WITH FROST PREVENTION

Adolphe Kundert, Zurich, Switzerland

Application September 21, 1953, Serial No. 381,204

Claims priority, application Switzerland September 23, 1952

2 Claims. (Cl. 62—117.55)

The present invention relates to a refrigerating or cooling plant of the type comprising a refrigerating or cooling plate adapted to receive goods to be maintained in fresh state and a frame bordering said cooling plate, such plant further comprising a compressor, a condensor and an evaporator.

It is a prime object of the present invention to provide a cooling or refrigerating plant of the above described type, in which at least a portion of the cooling fluid leaving the compressor is used for heating of the said frame bordering the cooling plate.

Thereby the deposit of condensation water between the not cooled bordering zone, i. e. the frame, and the cooled plate, provided with a layer of white frost, is prevented.

The refrigerating plant according to the present invention provides a sharp and esthetically effective border between the white frost carrying cooling plate on the one hand and the frame, which is dry due to the heating, on the other hand. This feature, i. e. the esthetical effect produced by the cooling plate of the present invention is of great importance as such cooling plants are mainly used to exhibit perishable goods, such as meat, fish etc., in window-shops or the like.

Some embodiments of cooling plants according to the present invention are illustrated, by way of example in the annexed drawings, in which:

Fig. 1 shows diagrammatically a first embodiment of a cooling plant according to the present invention, with the cooling plate removed.

Fig. 2 is a vertical section through the cooling plate and the frame.

Fig. 3 represents diagrammatically a second embodiment having two heat exchangers, and Fig. 4 is a similar view of a further embodiment.

According to Fig. 1 an electromotor 1 drives a compressor 2 and by means of a belt transmission 3 a ventilator 4 acting directly upon a condensor 5. Of course it is also possible to provide a water cooling device for the condensor 5 instead of the represented air cooling. In this case the ventilator 4 would not be necessary.

From the compressor 2 a duct 6 passes through the condensor 5 and leads to a collector 7. A further duct 8 connects this collector 7 with an expansion valve 9. The latter is connected with a conduit arranged in form of a cooling worm 10 within the space bordered by the frame 15. The conduit 10 leaves the frame at 10a and passes through a heat exchanger 11 and from the latter through a conduit 12 back to the compressor 2.

Shortly after having left the compressor 2 a conduit 13 branches off the duct 6, which conduit 13 traverses the heat exchanger 11 and leads from the latter, as conduit 14 to the frame 15 and along the latter into the collector 7.

The section represented at Fig. 2 shows some details of the construction. The frame 15 is fixed to a bottom plate 16. The duct 14 is connected in heat-conducting relation to the inner wall of the frame 15 and the container 17 formed by the frame 15 and the bottom plate 16 is filled with any suitable insulating material such as glass wool, cork or the like.

The cooling device is closed by a cooling plate 18, preferably of rust-proof material. In Fig. 1 this cooling plate 18 is removed in order to make visible the arrangement of the cooling worm 10. This cooling plate 18 is inserted into the frame 15, as clearly visible in Fig. 2, and fixed to the frame by means of setting screws 19 clamping the plate 18 between a clamping strip 20 and a sealing 25 bearing against a bent-over portion 21 of the upper rim of the frame 15. The ducts of the cooling worm 10 are heat-conductively secured to the lower surface of the plate 18.

The described plant operates as follows: The cooling fluid heated by its compression in the compressor 2 leaves the latter in gaseous state. A portion of this hot cooling medium follows the duct 6 into the condensor 5. In the latter it is liquefied and flows into the collector 7. It leaves the latter, still in liquid state, through the conduit 8 and passes through the expansion valve 9. In the latter the cooling fluid is expanded under refrigeration and flows through the cooling worm 10, giving out cold to the cooling plate 18, which, as it is in direct contact with the atmosphere is rapidly covered by a layer of white frost as the atmospheric humidity deposits on the cooling plate.

After its passage through the cooling worm 10 the cooling fluid passes through the heat exchanger 11 and through the conduit 12 to the inlet of the compressor 2.

The portion of the cooling fluid, which does not follow the conduit 6 but branches off through the conduit 13, passes through the heat exchanger 11 and from the latter through a conduit 14 running along the frame 15, and finally into the collector 7. As it passes through the conduit 14 the cooling fluid, which was heated in the compressor, and which has given out only a portion of its heat in the heat exchanger 11 gives out heat to the frame 15, heating the latter to prevent formation of condensation water thereon.

The heat exchanger 11 has a double effect. On the one hand it somewhat warms up the cooling fluid returning from the cooling worm before entrance of the latter into the compressor. The heat necessary for this purpose is taken from the hot cooling fluid on its way to the conduit 14 of the frame 15 through the conduit 13, thereby preventing an exaggerated heating of the frame 15, which could endanger the white frost covering on the cooling plate 18. Preferably the temperature of the cooling fluid in the conduit 14 should not be more than 10° C. higher than the room temperature. This is easily adjustable by the heat exchanger 11.

According to the circumstances it may occur that in the heat exchanger 11 the cooling fluid, returning from the cooling worm 10 to the compressor 2, takes too much heat from the hot cooling fluid destined to heat the frame 15, so that the latter is not sufficiently heated and condensation water deposits thereon.

In order to prevent this, a second heat exchanger 22 may be connected into the return conduit from the cooling plate to the compressor as shown in the embodiment according to Fig. 3. This second heat exchanger 22 is further traversed by the cooling fluid leaving the frame 15 through the conduit 14 for the collector 7. In this heat exchanger 22 heat is taken from the cooling fluid leaving the frame 15 so that it enters the collector 7 in liquid state through a conduit 23. This heat is used to heat a first time the cooling fluid returning from the cooling worm 10 to the compressor 2, so that less heat is afterwards taken from the fluid, destined to heat the frame, as it passes through the heat exchanger 11.

According to a third embodiment, represented in Fig. 4, the whole hot cooling fluid, leaving the compressor 2 through a conduit 26 is fed through the conduit 14 in the frame 15 previous to its passage through the condensor 5. In this embodiment the branch conduit 6, shown in Fig. 1 is not necessary. The whole stream of hot cooling fluid leaving the compressor 2 in gaseous state passes through the conduit 14 in the frame 15, enters the condensor 5, in which it is liquefied and flows, through a conduit 27, into the collector 7 and from the latter to the expansion valve 9, from which it is fed through the cooling worm 10 and from the latter returns directly to the compressor 2.

Obviously in this embodiment one or more heat exchangers could be connected at appropriate places into the circuit of the cooling fluid, as hereinbefore described with respect to the previous embodiments. For example such heat exchangers could be connected into the return conduit of the cooling fluid from the cooling worm to the compressor in order to heat this cooling fluid previous to its entering the compressor. The heat necessary therefor could be taken from the hot gaseous fluid leaving the compressor for the frame and/or as it returns from the frame to enter the condensor.

What I claim is:

1. A refrigerating plant, comprising a cooling plate, a cooling worm provided below said cooling plate in heat-conducting relation therewith and adapted to contain cooling fluid for cooling said plate, a frame bordering said plate, conduit means associated with said frame in heat-conducting relation, a cooling unit comprising a compressor, a condensor, a collector, an expansion valve and two heat exchangers, conduit means connecting said compressor to said conduit in said frame and adapted to feed hot cooling fluid leaving the compressor to one of said heat exchangers and from the latter through said conduit in the frame for heating of the latter, conduit means connecting said conduit in the frame with the second of said heat exchangers and the latter with the collector, further conduit means, branching off from said conduit from the compressor to said first heat exchanger, and adapted to feed cooling fluid through the condensor, collector and expansion valve and from the latter in expanded cooling state through said cooling worm below said cooling plate, and further conduit means connecting said cooling worm with the first and the second of the said heat exchangers and the latter with the inlet of the compressor.

2. A refrigerating plant, comprising a cooling plate, a cooling worm provided below said cooling plate in heat-conducting relation therewith and adapted to contain cooling fluid for cooling said plate, a frame bordering said plate, conduit means associated with said frame in heat-conducting relation, a cooling unit comprising a compressor, a condensor, a collector, an expansion valve, conduit means connecting said compressor to said conduit in said frame and adapted to feed hot cooling fluid leaving the compressor through said conduit in the frame for heating of the latter, conduit means connecting said conduit in the frame with the condensor for condensation of the hot cooling fluid in gaseous state, conduit means for feeding said condensed cooling liquid to said collector and from the latter to said expansion valve for expansion of said condensed cooling fluid, and further conduit means for feeding said expanded cooling fluid through said cooling worm and further conduit means connecting said cooling worm with the inlet of the compressor.

References Cited in the file of this patent
UNITED STATES PATENTS

| | | |
|---|---|---|
| 2,640,329 | Ingvardsen | June 3, 1953 |
| 2,641,908 | La Porte | June 16, 1953 |